United States Patent
Phan et al.

(10) Patent No.: US 9,959,515 B2
(45) Date of Patent: *May 1, 2018

(54) OPTIMIZED ASSET MAINTENANCE AND REPLACEMENT SCHEDULE

(71) Applicant: International Business Machines Corporation, Armonk, NY (US)

(72) Inventors: Dung Phan, Ossining, NY (US); Jinjun Xiong, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 221 days.

This patent is subject to a terminal disclaimer.

(21) Appl. No.: 14/796,704

(22) Filed: Jul. 10, 2015

(65) Prior Publication Data

US 2016/0148137 A1    May 26, 2016

Related U.S. Application Data

(63) Continuation of application No. 14/551,522, filed on Nov. 24, 2014.

(51) Int. Cl.
    *G06F 11/30*    (2006.01)
    *G21C 17/00*    (2006.01)
    (Continued)

(52) U.S. Cl.
    CPC .... *G06Q 10/06312* (2013.01); *G01M 99/008* (2013.01); *G06Q 10/20* (2013.01); *Y02P 90/86* (2015.11)

(58) Field of Classification Search
    CPC .......... A61B 5/0205; A61B 2562/0204; A61B 5/029; A61B 5/6832; A61B 5/6843;
    (Continued)

(56) References Cited

U.S. PATENT DOCUMENTS 7,203,622 B2    4/2007    Pan et al.
8,560,368 B1    10/2013    Maity et al.
(Continued)

OTHER PUBLICATIONS

Sahin et al., "Quality, Warranty, and Preventive Maintenance" Kluwer Academic Publishers, 1998, 235-265.*
(Continued)

*Primary Examiner* — Roy Y Yi
(74) *Attorney, Agent, or Firm* — Scully, Scott, Murphy & Presser, P.C.; Daniel Morris, Esq.

(57) ABSTRACT

There are provided a system, a method and a computer program product for generating an optimal preventive maintenance/replacement schedule for a set of assets. The method includes receiving data regarding an asset, said data including a failure rate function of said asset, a cost of preventative maintenance (PM) of said asset, a cost of an asset failure, and a cost of replacing an asset. An optimal number K of preventative maintenance time intervals $t_k$ and an indication of a possible replacement is computed and stored for each asset by minimizing a mean cost-rate value function with respect to an electrical age of the asset. A first PM schedule is formed without consideration of labor and budget resource constraints. The method further generates a second maintenance schedule for a system of assets by minimizing a deviation from the optimal PM time intervals subject to the labor and budget resource constraints.

8 Claims, 14 Drawing Sheets

(51) Int. Cl.
*G06Q 10/06* (2012.01)
*G01M 99/00* (2011.01)
*G06Q 10/00* (2012.01)

(58) Field of Classification Search
CPC ....... A61B 5/7203; A61B 5/7225; A61B 7/00; A61B 7/003; A61B 7/04; A61B 5/0022; A61B 2560/0257; A61B 2560/0443; A61B 2562/08
See application file for complete search history.

(56) References Cited

U.S. PATENT DOCUMENTS

| | | |
|---|---|---|
| 2003/0158803 A1 | 8/2003 | Darken et al. |
| 2011/0093310 A1 | 4/2011 | Watanabe et al. |
| 2012/0130759 A1 | 5/2012 | Davenport et al. |
| 2012/0173301 A1 | 7/2012 | Dong et al. |
| 2012/0316906 A1 | 12/2012 | Hampapur et al. |
| 2014/0101492 A1* | 4/2014 | Langer .................... G06F 11/00 714/47.1 |
| 2014/0163936 A1 | 6/2014 | Hosking et al. |
| 2014/0236650 A1 | 8/2014 | Davenport et al. |

OTHER PUBLICATIONS

Abiri-Jahromi et al.; "A Two-Stage framework for power transformer asset maintenance management—Part I: Models and formulations;" IEEE Transactions on Power Systems, vol. 28, No. 2, pp. 1395-1403; May 2013; Publisher: Institute of Electrical and Electronics Engineers Inc.; Country of Publication: USA; ISSN: 08858950; Database: Ei Compendex(R).

Hager et al., "Gradient-Based Methods for Sparse Recovery," arXiv:0912.1660v1 [math.OC] 9 Dec. 2009, pp. 1-16.

Jongen, "Statistical Lifetime Management for Energy Network Components," Ph.D. Thesis, Delft University of Technology (2012) Jun. 7, 2012.

List of IBM Patents or Patent Applications Treated as Related.

Office Action dated Jun. 29, 2017 received in a related U.S. Appl. No. 14/551,552.

* cited by examiner

ALGORITHM 2: Compute an optional number of PMs $K$ input: $f_1(y,K), f_2(y,K), K_{max}$
output: $K_{opt}, y_{opt}$ $f_{opt} \leftarrow +\infty$
$K_{opt} \leftarrow 0$
$y_1^0 \leftarrow -1$ for $k = 0, \ldots, K_{max}$ do
    Solve problems 5-8 using $y^0$ as a starting point to get $f_1(y,k)$
    Solve problems 9-12 using $y^0$ as a starting point to get $f_2(y,k)$
    $f_{temp} \leftarrow \min\{f_1(y,k), f_2(y,k)\}$
    if $f_{temp} < f_{opt}$ then
        $f_{opt} \leftarrow f_{temp}$
        $K_{opt} \leftarrow k$
        $y_{opt} \leftarrow \arg\min_y \{f_1(y,k), f_2(y,k)\}$
        $y_{1:k}^0 \leftarrow y_{opt}$
        $y_{k+1}^0 \leftarrow y_{opt,k}/2$
    else
        return;

FIG. 8

```
// computing idx1, idx2, they are lower and upper bounds for PM intervals
for (n=0); n<N; n++){
    idx1 [0][n] = max (0, tau [0][n] - 2);
    if (tau[1][n] - tau[0][n] > 1) idx2[0][n] = min(I-1, tau [0][n]+1);
    else  idx2[0][n] = tau[0][n];

for (k=1; k<K[n]; k++){
        if (tau[k][n] > -1){ //tau[k][n] = -1 means neither PM nor
            Replacement
            if (tau[k][n] - tau[k-1][n] = 1){
                idx1[k][n] = tau[k][n];
                idx2[k][n] = tau[k][n];
            }
            else {
                idx1[k][n] = max(idx2[k-1][n]+1, tau[k][n]-2)
                if (k < maxK-1) {
                    if (tau[k+1][n] > -1)
                        idx2[k][n] = min(tau[k+1][n]-1, tau[k][n]+1);
                    else
                        idx2[k][n] = min(I-1, tau[k][n]+1);
                }
                else  idx2[k][n] = min(I-1, tau[k][n]+1);
            }
        }
        else {
            idx1[k][n] = tau[k][n];
            idx2[k][n] = tau[k][n];
        }
    }
}
```

OPTIMIZED ASSET MAINTENANCE AND REPLACEMENT SCHEDULE

CROSS REFERENCE TO RELATED APPLICATION

This application is a continuation of U.S. patent application Ser. No. 14/551,522, filed Nov. 24, 2014 the entire content and disclosure of which is incorporated herein by reference.

FIELD

This disclosure relates generally to preventative maintenance of assets, and when to carry out preventive maintenance and when to carry out a replacement for a system of assets during a finite time horizon under limited resources.

BACKGROUND

Currently, periodically scheduled maintenance is the most commonly used maintenance policy. There are shortcomings to this: Scheduled maintenance does not take into the future health condition of the asset, thus is often conservative. Condition-based maintenance is performed when an indicator of the health condition of the asset reaches a predetermined level.

Continuously monitoring the condition indicator and assessing the current system's health condition is difficult, and often results in a high cost of operation.

SUMMARY

There are provided a system, a method and a computer program product for determining when to carry out a preventive maintenance and a replacement for a system of assets during a finite time horizon under limited resources.

An analytics approach is provided that is based on asset aging prediction which exploits different data sources and models such as electrical models, asset data, customer data, and external data.

The system and method provides an optimization decomposition framework consisting of method steps to compute independently the optimal preventive maintenance (PM) time intervals for each asset based on its failure rate function; and determine the maintenance schedule for the system of assets by minimizing the deviation from the optimal PM time intervals subject to the labor and budget resource constraints.

In one aspect, there is provided a method for finding an optimal preventive maintenance/replacement schedule for a set of assets. The method comprises: receiving, at a programmed processor device, data regarding an asset, the data including a failure rate function of the asset, a cost of preventative maintenance (PM) of the asset, a cost of an asset failure, and a cost of replacing an asset; computing, using the programmed processor device, an optimal number of preventative maintenance actions K and time intervals $t_k$ for each asset independently by minimizing a mean cost-rate value function with respect to an electrical age of the asset $y_k$, wherein the schedule is formed without considering a labor and budget resource constraints; storing the optimal number of preventative maintenance time intervals for each asset as data in a memory storage device; and generating a schedule of the optimal number of time intervals from the stored data.

In a further aspect, there is provided a system for generating an optimal preventive maintenance/replacement schedule for a set of assets. The system comprises: a memory storage device for storing data; a programmed processor device coupled to the memory storage device and configured to: receive data regarding an asset, the data including a failure rate function of the asset, a cost of preventative maintenance (PM) of the asset, a cost of an asset failure, and a cost of replacing an asset; compute an optimal number of preventative maintenance actions K and time intervals $t_k$ for each asset independently by minimizing a mean cost-rate value function with respect to an electrical age of the asset $y_k$, wherein the schedule is formed without considering a labor and budget resource constraints; store data representing the optimal number of preventative maintenance time intervals for each asset in the memory storage device; and generate a schedule of the optimal number of time intervals from the stored data.

A computer program product is provided for performing operations. The computer program product includes a storage medium readable by a processing circuit and storing instructions run by the processing circuit for running one or more methods. The methods run are the same as listed above.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 8 depicts an algorithm 350 run by the processor device for automatically computing an optimal number of PM actions K and time intervals $t_k$ in one embodiment;

FIG. 10 depicts a method for computing lower bound and upper bound for the PM intervals calculation in one embodiment;

FIGS. 12A-12B depict an example comparison of a total expected cost between the optimized maintenance schedules generated by the methods herein, against a cost resulting from a commonly used baseline scheme where a periodic PM is performed;

DETAILED DESCRIPTION

A system and method for determining when to perform a preventive maintenance and when to perform a replacement for a set of assets.

Based on the asset aging prediction which exploits different data sources and models such as electrical models, asset data, customer data, and external data.

Thus a system and method is provided for determining when to carry out a preventive maintenance and a replacement for a system of assets during a finite time horizon under limited resources.

Further, a system and method is provided for determining when to do a preventive maintenance and when to do a replacement for a set or system of assets. In the domain of power generation these assets may comprises power transformers and distribution transformers.

Figure 1:
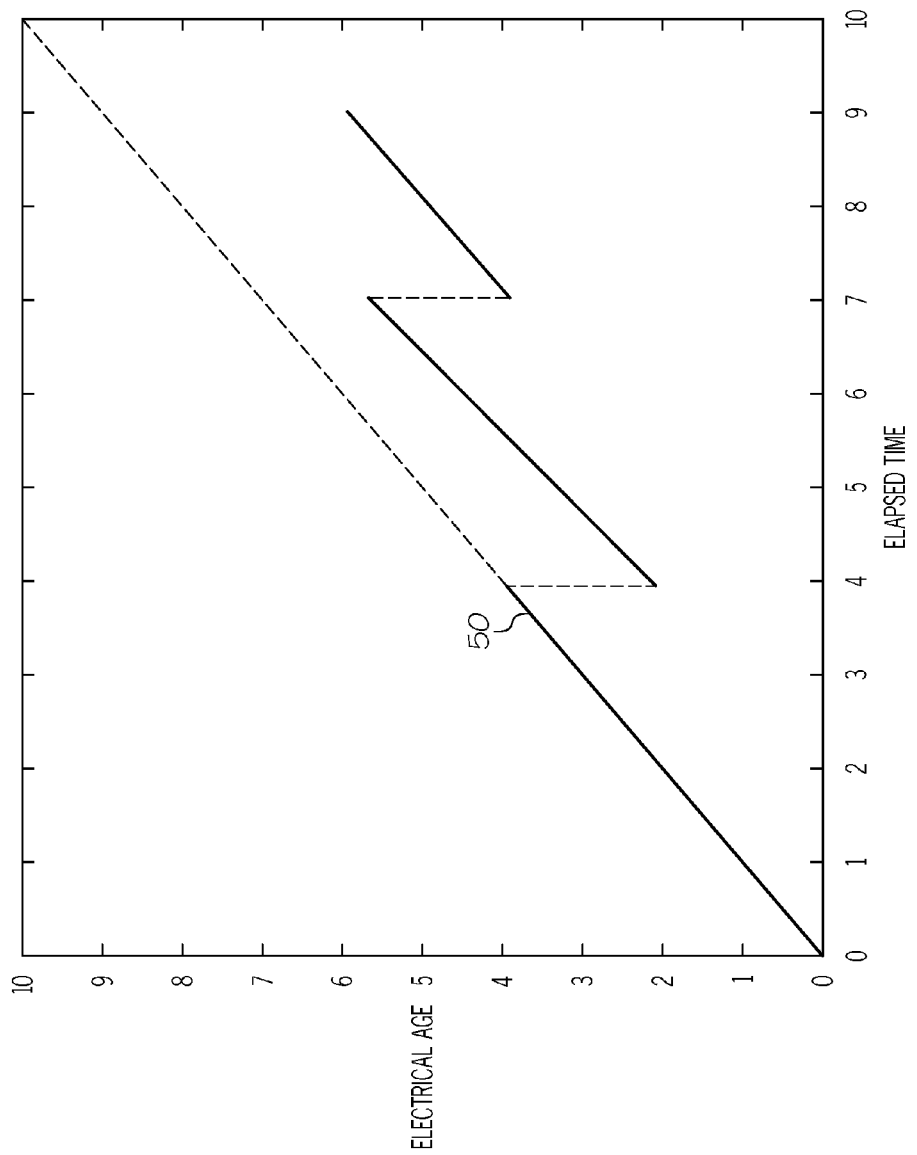
FIG. 1 illustrates an example of a general health condition of an asset, e.g., a piece of equipment, as determined by its electrical age.
Figure 2:
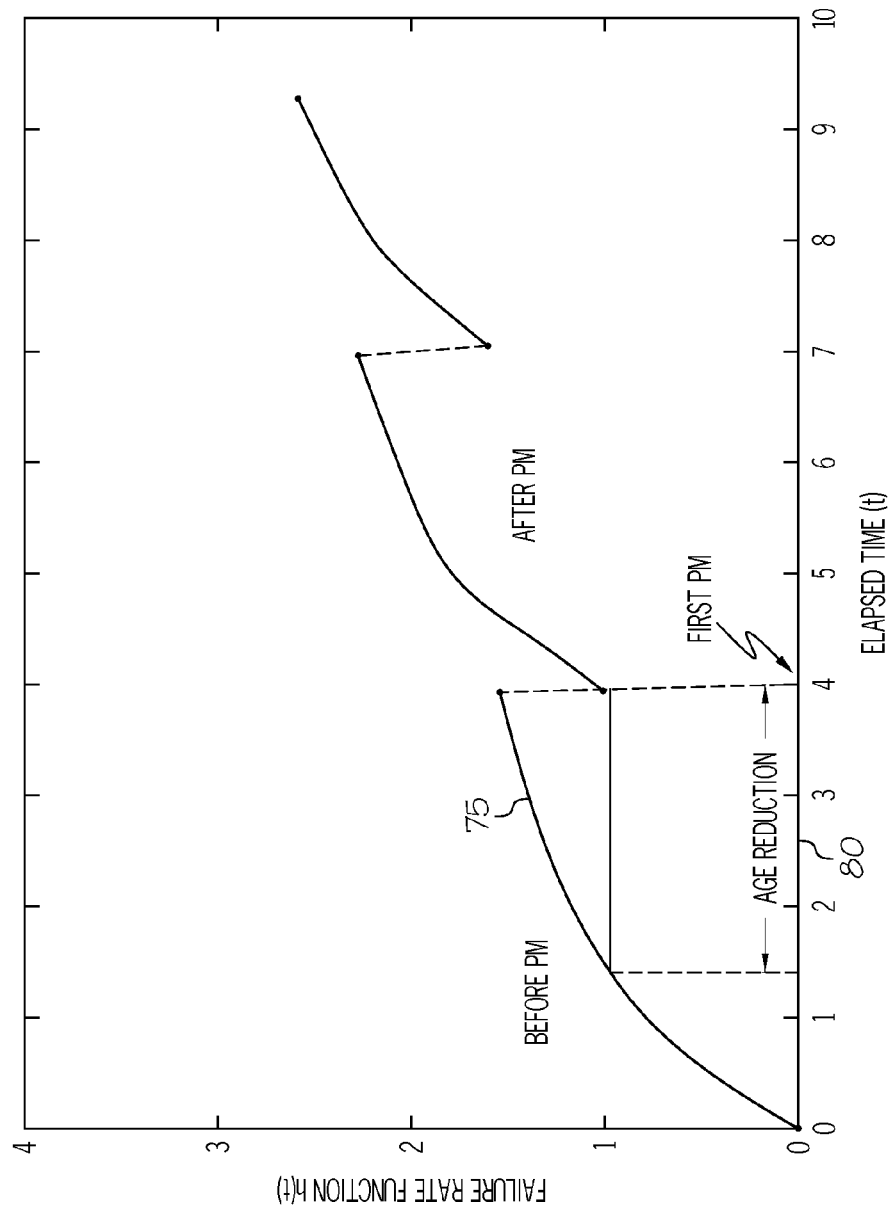
FIG. 2 illustrates an example of a failure rate function $h_0(t)$ that is input for the maintenance optimization schedule framework and its impact on electrical age.

As shown in FIG. 1, the general health condition of an asset 50, e.g., a piece of equipment is determined by its electrical age, and a failure rate function h(t) 75 as shown in FIG. 2. The main purpose of a preventive maintenance (PM) is to modify failure rate functions, make them as small as possible. Electrical age is often smaller than the calendar age (or can be improved) if some maintenance activities have been introduced. In the example plot shown in FIG. 2, a first PM time is introduced and as a result effectively reduces the electrical age by an age reduction amount 80 as shown. Preventive maintenance makes an asset's electrical age<calendar age (or smaller than expected electrical age). A number of failures between a time t=a and t=b is given by a relation $$\int_a^b h(t)dt,$$

where h(t) is a failure rate function for that asset.

In one embodiment, an optimization decomposition framework is provided that runs methods including: a first step for computing independently the optimal preventive maintenance (PM) time intervals for each asset based on its failure rate function. A second step for determining the maintenance schedule for the system of assets by minimizing a deviation from the optimal PM time intervals subject to the labor and budget resource constraints.

To formulate an asset maintenance schedule optimization and required data, the system and method receives input data. For purposes of illustration, the assets to be maintained include electrical power transformer devices (transformer). For this description, the following data pertaining to a transformer asset are received including:

1) A given time horizon for planning purpose with a fixed budget constraint, which needs to be represented as Net Present Value (NPV) as the assets are considered as capital investment with longer term usage. In one embodiment, a suggested NPV interest rate may be 6.2%.

2) A set of transformers to be optimized for maintenance schedules, whose current electrical age conditions, failure probability functions, and the projected electrical aging conditions are based, for example, on a projected loading and ambient temperature. Since the scheduling optimization assumes certain discrete time points toward the future for the optimization, the projected electrical ages may be given as a set of electrical ages, each of which is for a period of time duration of the entire planning horizon.

3) A model that reflects the impact of maintenance and replacement on failure probability model parameters, various cost components of transformers, such as the maintenance cost, the replacement cost, and the failure (impact) cost.

4) A set of other constraints that may be considered. The output of this step is an optimized maintenance schedule for the set of assets, e.g., transformers. That is, in an example embodiment, the method models transformer failure probabilities explicitly using failure rate functions (e.g., that capture the health condition of an asset given the asset has survived to some point of time), models the impact of preventive maintenance on failure probability changes, and thus determines an optimal maintenance and replacement schedules for a set of transformers under various constraints.

There is now described the computer-implemented optimization system and method to find an optimal preventive maintenance/replacement schedule for a set of assets, e.g., transformers, under given budget and labor constraints. First, the problem formulation is introduced, and then a solution approach to solve it is given. Since the size of the problem under consideration is very large, which consists of several binary variables in the model, it becomes intractable to try to deal with the unified NP-hard nonlinear problem for the entire system. Thus, the system and method solution separates into two stages: computing optimal maintenance intervals for each transformer independently without considering the global constraints, and then forming a scheduling problem based on the optimal values from the first step taking into account the budget and labor constraints.

Optimized PM Intervals for Individual Unit

One aim of preventive maintenance (PM) activities is to decrease the failure rate and/or the electrical age of a transformer. Is is assumed that PM actions are performed at times $t_1, t_1+t_2, \ldots, \Sigma_{i=1}^{k-1} t_i$ with a cost $c_p$ for each PM and a possible replacement is at time $\Sigma_{i=1}^{K} t_i$ with a cost $c_r$ during a fixed time horizon of interest $\bar{t}$. The failure rate function is denoted according to Eq. 1) as:

$$h_0(t) = \text{failure rate function} \quad (1)$$

which will be described in detail later, if no PM intervention is conducted. The effect of PM at the k-th period is characterized by a hybrid model, which models the failure rate function $h_k(t)$ between the (k−1)-th and the k-th PMs by changing from the previous time interval $h_{k-1}(t)$ as $$h_k(t) = a_k h_{k-1}(b_k t_{k-1} + t),$$

where $h_k(t)$ is the failure rate function after the $k^{th}$ PM; $a_k$ is the adjustment factor in failure rate after the $k^{th}$ PM, $b_k$ is the adjustment factor in electrical age due to the $k^{th}$ PM and each adjustment factor $a_k, b_k$ estimated by the PM historical data. Letting $y_k$ be the electrical age immediately before the k-th PM, there is had:

$$t_k = y_k - b_{k-1} y_{k-1} \quad (2)$$

$$y_k = t_k + b_{k-1} t_{k-1} + \ldots + b_{k-1} b_{k-2} \ldots b_1 x_1 \quad (3)$$

$$\sum_{i=1}^{k} t_i = y_k + \sum_{i=1}^{k-1} (1 - b_{i-1}) y_{i-1}. \quad (4)$$

The total failure (impact) cost is computed from $$c_m \int_{b_{k-1} y_{k-1}}^{y_k} h_k(t) dt.$$

The following assumptions are made:
1. The failure rate function $h_0(t)$ is continuous and strictly increasing if there are no PM activities;
2. A minimal repair is carried out for a failure between PMs, and it only restores the function of the unit, but does not change the failure rate;
3. PM, repair, and replacement times are negligible;
4. A unit is "good-as-new" after a replacement.

The method includes determining the optimal scheduled intervals $t_k$ by minimizing the mean cost-rate, represented as a function with respect to the electrical age $y_k$, which is achieved by distinguishing two cases:

If there is no need to replace, the mean cost-rate optimization problem is formulated as $$\min_{y,K} f_1(y, K) = c_p(K-1) + c_m \sum_{k=1}^{K} \int_{b_{k-1} y_{k-1}}^{y_k} h_k(t) dt \quad (5)$$

$$\text{s.t. } y_k - b_{k-1} y_{k-1} \geq 0, k = 1, \ldots, K \quad (6)$$

$$y_K + \sum_{k=1}^{K-1} (1 - b_{k-1}) y_{k-1} = \bar{t} \quad (7)$$

$$y_k \geq 0, k = 1, \ldots, K. \quad (8)$$

The objective function (5) is the total cost of the unit over the fixed time horizon $\bar{t}$, including the cost for K−1 PMs and the expected cost of repairs for failures. The method imposes the positivity condition for the time intervals $t_k$ in (6) and the electrical age $y_k$ in (8), respectively. That is $y_k$ is the electrical age just before the $k^{th}$ PM. The constraint (7) is the length of the scheduled horizon. Note that at time $\Sigma_{k=1}^{K} t_k = \bar{t}$, there may be no a PM. The mean cost-rate is equal to the objective function value (5) divided by $\bar{t}$.

If the transformer needs to be replaced, the optimization problem becomes $$\min_{y,K} f_2(y, K) = \frac{c_p(K-1) + c_r + c_m \sum_{k=1}^{K} \int_{b_{k-1} y_{k-1}}^{y_k} h_k(t) dt}{y_K + \sum_{k=1}^{K-1} (1 - b_{k-1}) y_{k-1}} \quad (9)$$

$$\text{s.t. } y_k - b_{k-1} y_{k-1} \geq 0, k = 1, \ldots, K \quad (10)$$

$$y_K + \sum_{k=1}^{K-1} (1 - b_{k-1}) y_{k-1} \leq \bar{t} \quad (11)$$

$$y_k \geq 0, k = 1, \ldots, K. \quad (12)$$

The numerator of (9) comprises a replacement cost and the denominator is the total life of the transformer. Constraint (11) requires a replacement before the time $\bar{t}$. The method solves the two problems (5-8) and (9-12) simultaneously and selects the PM schedule associated with that of a smaller mean cost-rate. It is noticed that the above formulations have an integer variable K and continuous variables $y_k$'s. The optimum number of PM intervals K is calculated by explicit enumeration. For a fixed K, they are nonlinear continuous optimization problems, which can be written as the following general format with a nonlinear objective function $f$ for both problems (5) and (9):

$$\min_{y \in \Omega} f(y) \text{ s.t. } \Omega = \{y : Ay \leq b\}, \quad (13)$$

where A is a matrix, b is a vector. Because $h_0$ is continuous, hence $f$ is differentiable. In one embodiment, the method solves the optimization problem by a gradient projection algorithm, where the projection is a linearly constrained least squares problem. The warm-start capability of the gradient projection algorithm is exploited when increasing the value of K.

Figure 3:
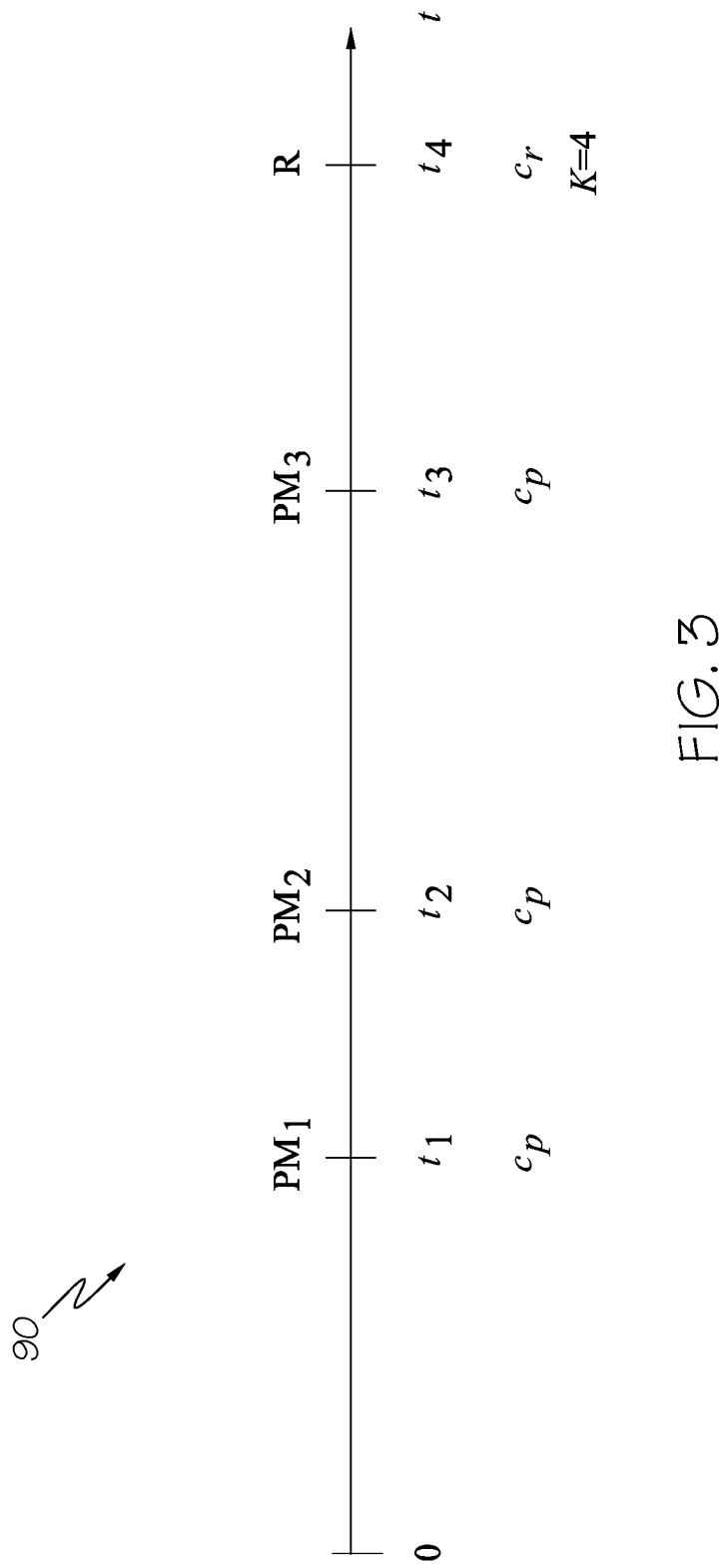
FIG. 3 shows an example time graph depicting an example schedule of Preventive Maintenance (PM) and replacement (R) costs for an asset.

FIG. 3 shows a time graph 90 depicting an example schedule of Preventive Maintenance (PM) and replacement (R) costs where cost is a value (K−1) $c_p + c_r$ where $c_p$ is the cost of preventative maintenance (e.g., at times $t_1$-$t_3$; $c_r$ is the cost of a replacement at time $t_4$; K is the number of preventative maintenance intervals; $t_k$ is a time for the preventative maintenance and $PM_k$ is the $k^{th}$ preventative maintenance.

Figure 4:
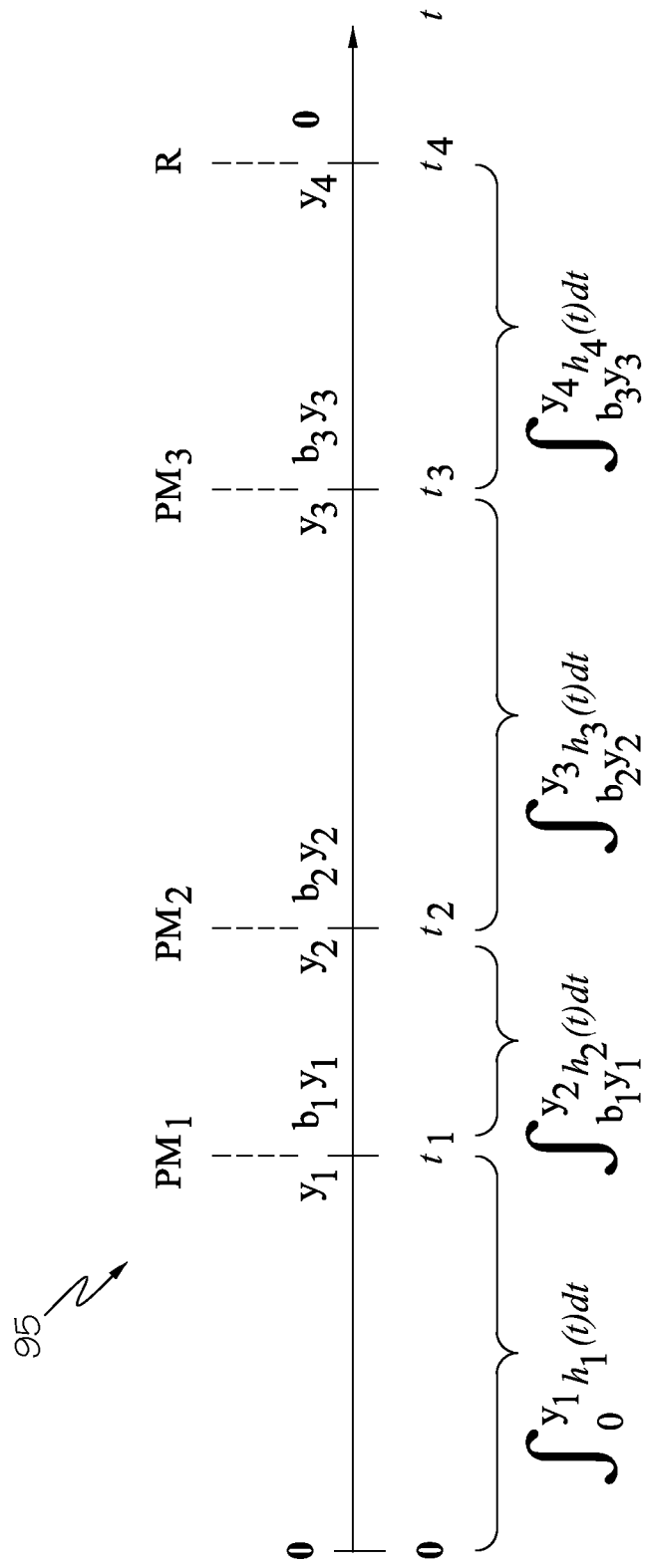
FIG. 4 shows an example time graph depicting an example schedule of interruption and repair costs corresponding to the schedule of FIG. 3.

FIG. 4 shows a time graph 95 depicting an example schedule of interruption and repair costs corresponding to the schedule of FIG. 3, wherein h(t) is the failure rate function; $h_k(t)$ is the failure rate function at the $k^{th}$ PM; $H_k(t)$ is the cumulative failure rate $\int h_k(t) dt$; $\int_{b_{k-1} y_{k-1}}^{y_k} h_k(t) dt = H_k(y_k) - H_k(b_{k-1}, y_{k-1})$ = the expected number of failures in $[t_{k-1}, t_k]$; $c_f$ is a cost of a failure;

$$\text{total failure cost} = c_f \sum_{k=1}^{K} [H_k(y_k) - H_k(b_{k-1}, y_{k-1})]; y_k$$

is the electrical age of the asset just before the $k^{th}$ PM; and $b_k$ is the adjustment factor in electrical age due to the $k^{th}$ PM.

Optimized Maintenance and Replacement Schedule

In operation, there are some operational and economical constraints for the entire asset system such as labor and budget availability for each period. If the PM planning based on the solution described in the first step herein above is deployed, some of these constraints may be violated. Thus, one scheduling strategy is to obey the global constraints for the final planning, but possibly readjust the optimal scheduled PM intervals for each transformer obtained from the first step. It is assumed that after a replacement, a brand-new unit with the same type is used. The continuous time horizon $\bar{t}$ is discretized into a finite evenly spaced time intervals I. The model performs minimizing the total deviation from the optimal PM intervals given from the first stage results. The following parameter notations are used in this embodiment:

[N] set of assets;
[I] set of time intervals;
[$K_n$] set of PMs and a possible replacement for the n-th asset;
[$r_n$] period for a replacement of the n-th asset;
[$w_n$] impact weight of the n-th asset;
[$t^{k,n}$] optimal PM intervals for the n-th asset obtained from the first stage;
[$\gamma_n$] manpower for a PM of the n-th asset;
[$\beta_n$] manpower for a replacement of the n-th asset;
[$\theta_n$] cost (e.g., in $) for a PM of the n-th asset;
[$\rho_n$] cost (e.g., in $) for a replacement of the n-th asset;
[$h_i$] maximum manpower availability during the i-th interval;
[$m_i$] maximum budget availability during the i-th interval (e.g., in $);
[m] total budget availability during I time intervals (e.g., in $);
[r] interest rate for net present value (NPV);
[$i_l^{k,n}$] lower bound for the deviation of the k-th PM or a replacement of the n-th asset;
[$i_u^{k,n}$] upper bound for the deviation of the k-th PM or a replacement of the n-th asset;

The following variable notation is used in this embodiment:
[$x_i^{k,n}$] binary variable indicating whether the k-th PM or a replacement is conducted for the n-th asset during the i-th interval (also referred to as $z_i^{k,n}$).

Utilizing processor device and memory resources, the method minimizes an objective function of the total deviation $$\min_{x_i^{k,n} \in \{0,1\}} \sum_{i \in I, n \in N, k_n \in K_n} w_n x_i^{k_n,n} |i - t^{k_n,n}| \quad (14)$$

The above objective function is subject to the following set of constraints:

1. Number of PMs for the n-th asset $$\sum_{i \in I, k_n \in K_n} x_i^{k_n,n} = K_n, n \in N \quad (15)$$

2. The k-th PM or a replacement is performed between [$i_l^{k,n}$, $i_u^{k,n}$]

$$\sum_{i_l^{k,n} \leq i \leq i_u^{k,n}} x_i^{k_n,n} = 1, k_n \in K_n, n \in N \quad (16)$$

$$x_i^{k_n,n} = 0 \text{ if } i \neq [i_l^{k,n}, i_u^{k,n}], k_n \in K_n, n \in N \quad (17)$$

3. Maximum manpower availability at the i-th interval $$\sum_{n \in N, k_n=1,\ldots,K_n-1} \gamma_n x_i^{k_n,n} + \sum_{n \in N} \beta_n x_i^{K_n,n} \leq h_i, i \in I \quad (18)$$

4. Maximum budget availability at the i-th interval $$\sum_{n \in N, k_n=1,\ldots,K_n-1} \theta_n x_i^{k_n,n} + \sum_{n \in N} \rho_n x_i^{K_n,n} \leq m_i, i \in I \quad (19)$$

5. Total budget $$m_1 = \frac{m_2}{1+r} + \frac{m_3}{(1+r)^2} + \ldots + \frac{m_I}{(1+r)^{I-1}} \leq m \quad (20)$$

6. No replacement condition
$x_i^{K_n,n}=0$, $i \in N$ if $r_n > 0$. \quad (21)

Without the global labor and budget constraints, the optimal solution from the first stage is also the optimal solution for the scheduling problem, i.e., no readjustment is needed. For important assets such as transformers that are close to hospitals and schools, the solution from the first stage should be used, which is done by selecting a high value for $w_n$. Constraints (16) and (17) not only ensure the deviation is not too large so as to retain the efficient schedule from the first stage, but also help to significantly reduce the number of binary variables for the formulation. It can remove up to 90% of binary variables, making the model attractive for a large scale system. The optimization problem (equations 14-19) is an integer linear programming problem, which can be efficiently solved by some MILP solvers such as IBM ILOG CPLEX Optimizer," (http://www.ibm.com).

Figure 5:
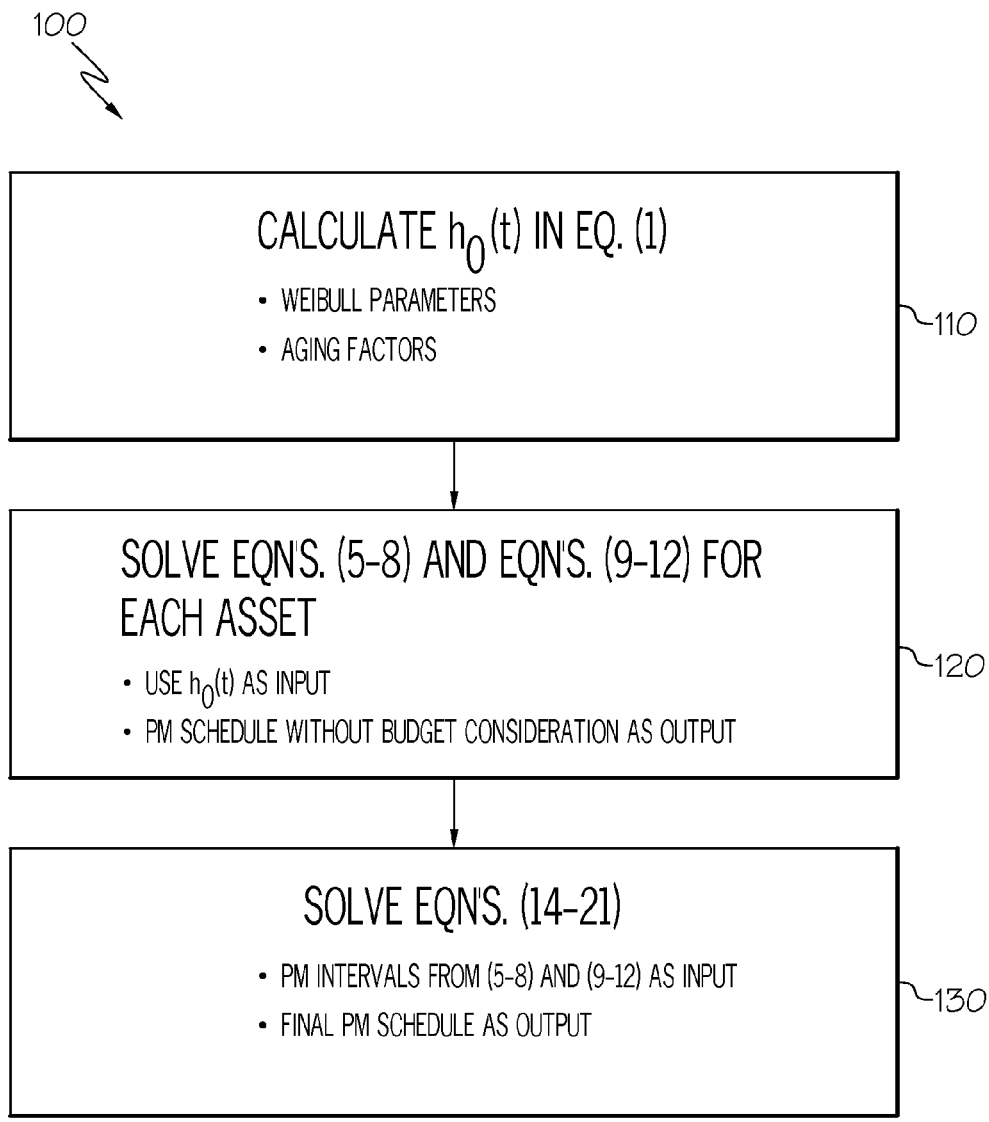
FIG. 5 shows a high level methodology 100 for the optimization framework in one embodiment.

FIG. 5 shows a high level methodology 100 for the optimization framework. In particular, a computer-implemented solution is provided in which the problem is addressed first at 110 by calculating the failure rate function $h_0(t)$ of an asset as presented in (1). Then, at 120, the method comprises computing independently the optimal preventive maintenance time intervals for each asset based on its failure rate function by inputting the failure rate function $h_0(t)$ to a programmed processor unit and solving equations 5)-8) and 9)-12) using the programmed processor unit, and outputting a schedule of time intervals; and, at 130, determining, using the processor unit, the maintenance schedule for the system of assets by minimizing the deviation from the optimal PM time intervals subject to the labor and budget resource constraints, and outputting the schedule. For non-limiting purposes of illustration, the asset is an electrical power transformer, part of a system of transformers.

Figure 6:
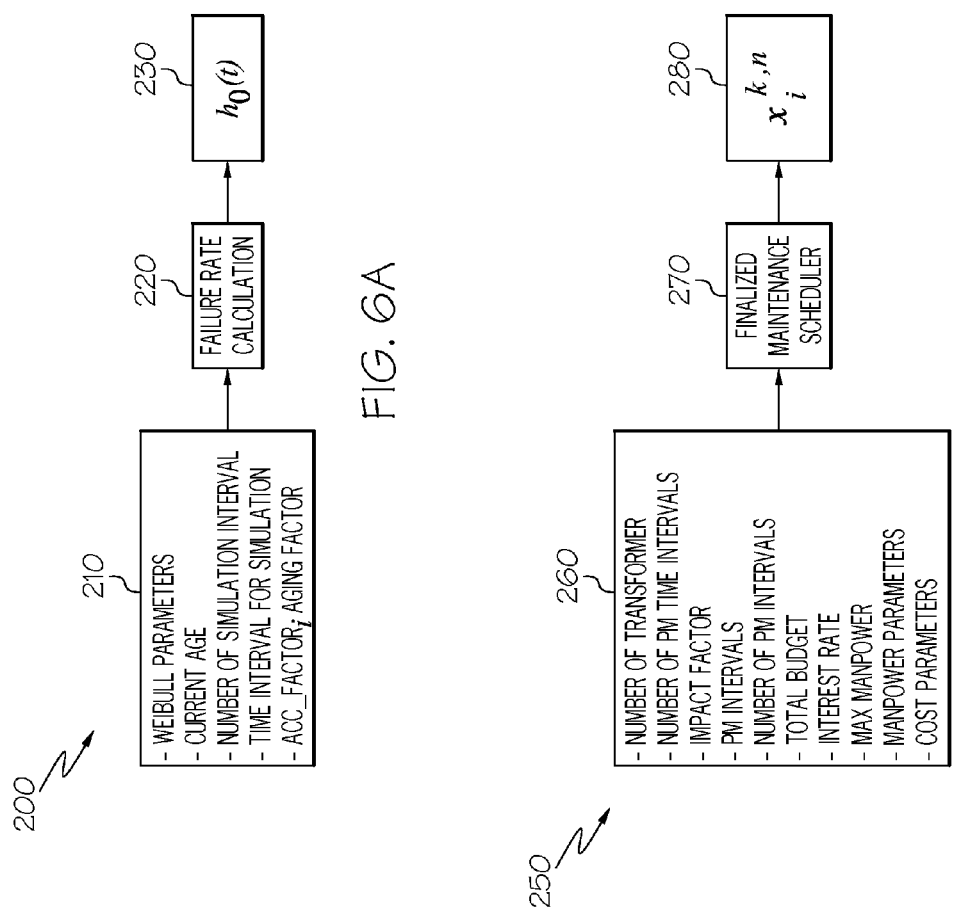
FIG. 6A depicts a high level method 200 of calculating the failure rate function $h_0(t)$ which is input for the maintenance optimization scheduling for an asset without labor and budget constraints in one embodiment.
FIG. 6B depicts a high level method 250 of calculating the optimized maintenance scheduler given a set of inputs for a set of assets including labor and budget constraints in one embodiment.

With respect to step 110, FIG. 5, FIG. 6A depicts a high level method 200 of calculating the failure rate function $h_0(t)$ as presented in equation (1), which is input for the maintenance optimization scheduling for an asset. It is first assumed that the asset failure rate has a Weibull distribution defined as:

$h_{initial}(t) = \beta t^\alpha$.

Input parameters at 210 thus include Weibull parameters, a current age of the asset, the number of simulation intervals; a time interval for simulation and an accelerated aging factor "acc_factor". For an example electrical power transformer asset, in one embodiment, it is supposed that the transformer has been installed for $t_0$ years, and the transformer aging calculation outputs accelerated aging factor "acc_factor" for a set of N future time periods with a simulation time interval Δt. For a given time t, there is defined:

$$N_0 = \left[\frac{t}{\Delta t}\right],$$

where [x] returns the largest integer not greater than x. As depicted at step 220, FIG. 6A, the failure rate function taking the aging factor into consideration is computed according to:

$$h_{acc}(t) = \beta\left(t_0 + \Delta t \sum_{i=1}^{N_0} \text{"acc\_factor"}_i + \text{"acc\_factor"}_{N_0+1}(t - N_0\Delta t)\right)^\alpha. \quad (22)$$

It can be verified that $h_{acc}(t)$ is a discontinuous function, thus problems (5) and (9) are very difficult to be solved. The method smoothens the function around the breakpoints by a linear approximation using a small number ϵ close to 0, for example, ϵ=0.01. Thus, defining $$\underline{t}=N_0\Delta t+(1-\epsilon)\Delta t, \text{ and } \hat{t}=(N_0+1)\Delta t.$$

The approximated failure rate function $h_0(t)$ output at 230 is defined as follows:

$$h_0(t) = \begin{cases} h_{acc}(t), & \text{if } t \le \underline{t} \\ \frac{h_{acc}(\hat{t}) - h_{acc}(\underline{t})}{\hat{t} - \underline{t}}(t - \underline{t}) + h_{acc}(\underline{t}), & \text{otherwise} \end{cases} \quad (23)$$

Figure 7:
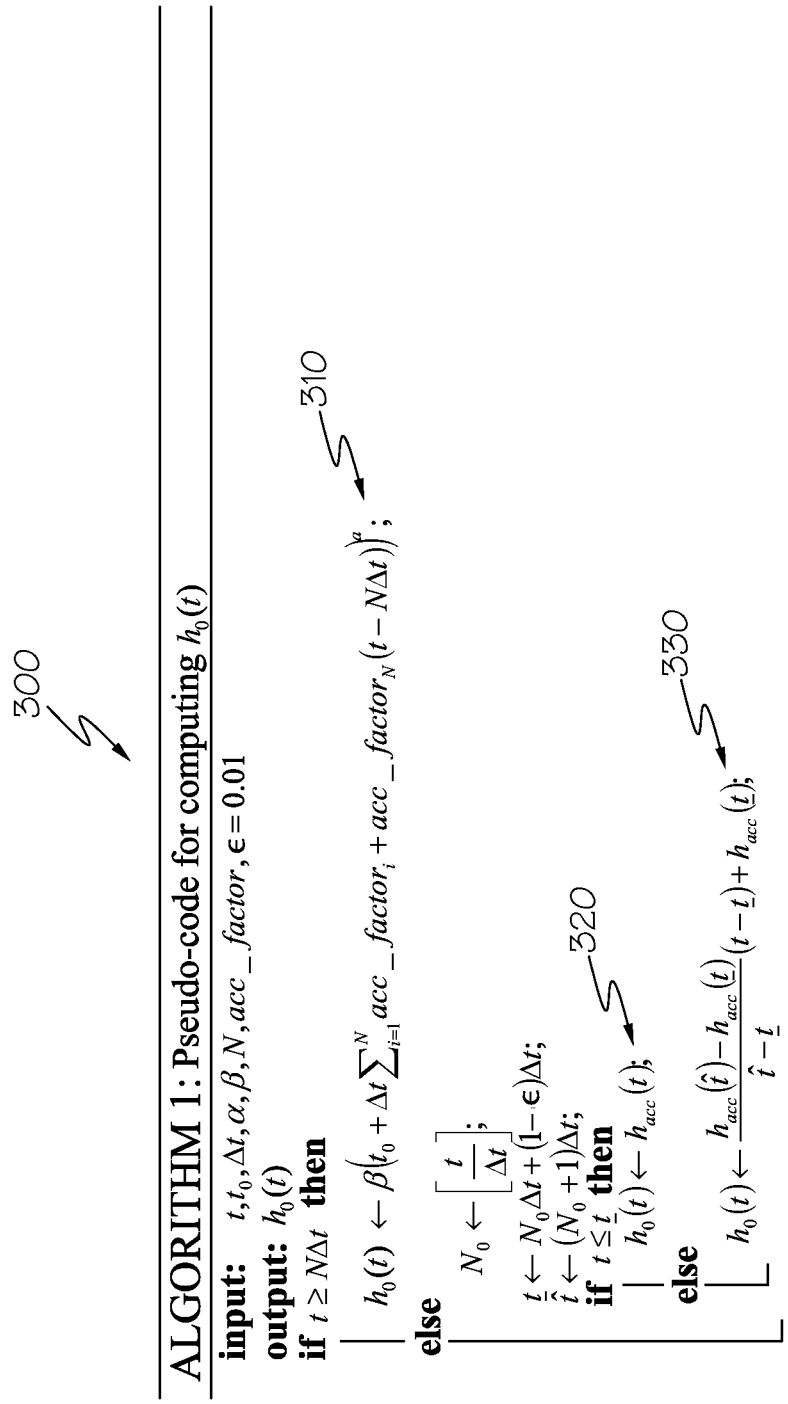
FIG. 7 depicts the failure rate calculation algorithm 300 run by a processor device to provide $h_0(t)$ input to optimization framework in one embodiment.

As shown in FIG. 6A, the failure rate calculation implements an algorithm for computing the $h_0(t)$ output 230. FIG. 7 depicts the failure rate calculation algorithm 300 run by the processor unit to provide $h_0(t)$ output. That is, given Weibull parameter inputs α, β, a current age $t_0$ of the transformer (asset), a number of simulation intervals N, a time interval Δt for simulation, the aging factor acc_factor, and ϵ=0.01 at 301, the processor unit running algorithm 300 either computes $h_0(t)$ at 310 for the case where t≥NΔt, computes $h_0(t)$ at 320 for the case where t≤√t̄ or computes $h_0(t)$ at 330 for the case where t>t̄.

Individually Optimized Schedule

It is noticed that an optimal maintenance policy for an asset (e.g., a transformer) involves two decision variables: the number of PMs and a possible replacement K, and the PM intervals $t_i$ (equivalently, $y_i$ due to equation (4) herein above).

FIG. 6B depicts a high level method 250 of calculating the optimized maintenance scheduler given a set of inputs 260 including a number N of transformers, a number of PM time intervals I, an impact factor $w_n$, PM intervals $t^{k,n}$, a number $K_n$ of PM intervals, a total budget in, an interest rate r, and max manpower $h_i$, manpower parameters $\gamma_n, \beta_n$, and cost parameters $\theta_n, \rho_n$ inputs. Given the inputs, the processor unit performs an algorithm at 270 to compute the finalized maintenance schedule. As part of the process, the final optimized scheduler implements an algorithm that computes a binary variable $x_i^{k,n}$ output 280. In one embodiment, $x_i^{k,n} \in \{0,1\}:=1$ if the $k^{th}$ PM is performed for the $n^{th}$ transformer at $i^{th}$ interval.

More particularly, the objective for calculating the optimized maintenance scheduler subject to the labor and budget resource constraints is to minimize a total deviation from the optimal PM intervals $t^{k,n}$, i.e., $$\min_{x_i^{k,n} \in \{0,1\}} \sum_{i \in I, n \in N, k_n \in K_n} w_n x_i^{k_n,n} |i - t^{k_n,n}|.$$

Figure 9:
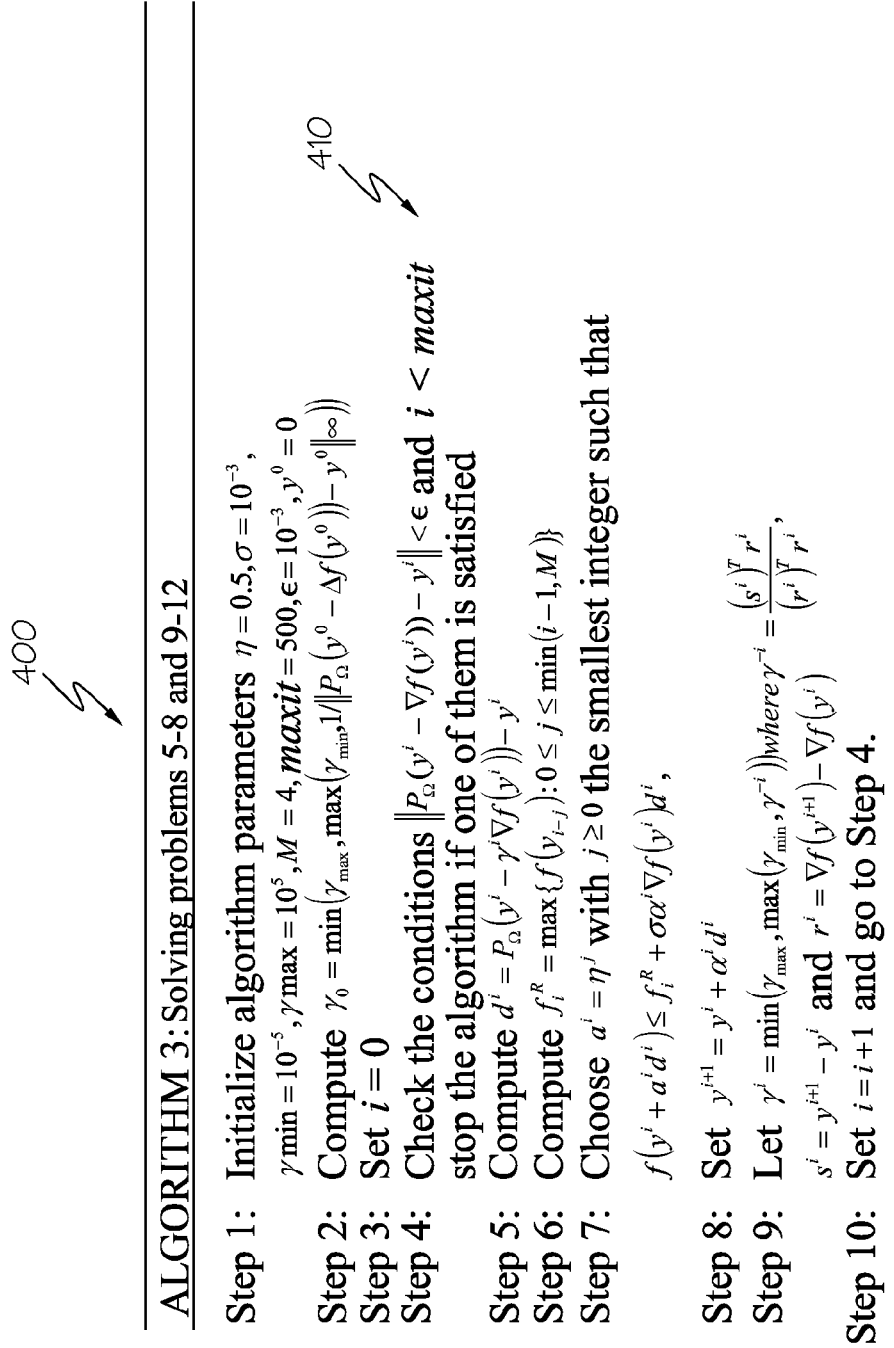
FIG. 9 depicts an algorithm 400 for automatically solving equations PM optimization calculations using non-linear programming in one embodiment.

FIG. 8 depicts an algorithm 350 run by a processor unit, for computing an optimal number of PM actions K. In the algorithm 350, implemented in a processing loop for finding optimal PM intervals $t_k$, with an iteration finding an optimal value K (e.g., the optimium number of PM intervals) and $y_i$ (e.g., the output used to calculate the PM time points $t_k$). As shown in the algorithm 350 of FIG. 8, for a fixed k, problems of equations 5)-8) and 9)-12) are solved. They are compactly recast as a general optimization problem as in equation (13). The algorithm 350 for solving equation (13) needs to evaluate problem functions at a given point y. Thus, as shown in FIG. 8, there is input to the algorithm 350 the objective function $f(y)$-particularly, $f_1(y,K)$, $f_2(y,K)$, and $K_{max}$, which is run to solve equations 5)-8) and 9)-12) and generate the optimal values $K_{opt}$ and $y_{opt}$ for output. For example, the algorithm implements a processing loop 360 for k=0, . . . , $K_{max}$ to solve equations 5)-8) at 370 using $y^0$ as a starting point to get $f_1(y,k)$ and to solve equations 9)-12) at 380 using $y^0$ as a starting point to get $f_2(y,k)$ from which both $K_{opt}$ and $y_{opt}$ are obtained. The variable $f_{temp}$ takes the smallest value among $f_1(y,k)$, $f_2(y,k)$. In one embodiment, the algorithm 400 depicted in FIG. 9 is used in the algorithm 350 at steps 370, 380 to obtain respective values for $f_1(y,k)$, $f_2(y,k)$. In algorithm 350 the loop processing 360 provides output $K_{opt}$ which is the optimum number of PM intervals; and the output $y_{opt}$ in algorithm 350 is used in equation 4) to calculate the PM time points $t_i$.

In one embodiment, as both optimization problems (equations 5-8) and (equations 9-12) can be recast in the same general framework (13), and the algorithm 400 depicted in FIG. 9 is used to solve the problem of equation 13). That is, in one embodiment, the algorithm 400 shown in FIG. 9, solves the equations 5)-8) and equations 9)-12) one at a time using a CPLEX solver, e.g., CPLEX with Concert Technology, in which the objective function is $f(y)$, and $\nabla f(y)$ is the gradient of the objective, and a projection of y onto a feasible region Ω is denoted $P_\Omega(y)$. In view of algorithm 400 of FIG. 9, there is a loop processing comprising steps 4 through step 10 in which index i is iterated with check conditions provided at 410 to determine if the quantity $\|P_\Omega(y^i - \nabla f(y^i)) - y^i\| < \epsilon$ which stops the iteration if satisfied. Thus, method steps 410 et seq. solves a projection sub-problem arising from the gradient projection algorithm which sub-problem is to compute $P_\Omega(y^i - \nabla f(y^i))$ by CPLEX solver.

The integer linear problem programming (of equations 14-19) is also solved by the CPLEX solver, e.g., CPLEX with Concert Technology. The model is invoked by calling CPLEX for the reduced MIP problem. In one embodiment, there are two strategies that are implemented to reduce the size of problem (of equations 14-19): In a first strategy, a determination is made as to whether the value input for the impact weight $w_n$ is bigger than a threshold. In one embodiment, the threshold may comprise the median of $w_n$. If by comparison the input impact weight value $w_n$ is greater than the threshold, then the maintenance schedule is fixed and computed for the $n^{th}$-asset. Additionally, the method selects suitable values for a lower bound $i_l^{k,n}$ and an upper bound $i_u^{k,n}$ in equations (16) and (17), respectively. In one embodiment, a method for computing a lower bound PM interval and an upper bound for PM interval is shown in the example pseudo-code description 500 of an algorithm as depicted in FIG. 10.

Without the global labor and budget constraint, the optimal solution from the first stage is also the optimal solution for the scheduling problem, i.e., no readjustment is needed. For an important asset such as those transformers that are close to hospitals and schools, the solution from the first stage may be used, which is done by selecting a high value for $w_n$. Constraints in equations 16)-17) not only ensure the deviation is not too large so as to retain the efficient schedule from the first stage, but also help to significantly reduce the number of binary variables for the formulation because $x_i^{k,n}=0$ for any index i outside of the range $[i_l, i_u]$. That is, implementation of the algorithm of FIG. 10 and the fixing of some schedule from the $1^{st}$ stage processing based on impact weight help to remove up to 90% of binary variables that makes the model attractive for a large scale system. The optimization problem in equations 14)-21) is an integer linear problem programming, which can be efficiently solved by some MILP solvers such as CPLEX.

An example implementation follows: given a planning horizon for the set of transformers of four years with one month time interval being selected in this example. A CPLEX version 12.5 solver is implemented to solve the scheduling problem (13)-(21) and the projection sub-problem arising from the gradient projection algorithm. The impact weight factor $w_n$ is calculated based on the number of customers downstream.

Figure 11A:
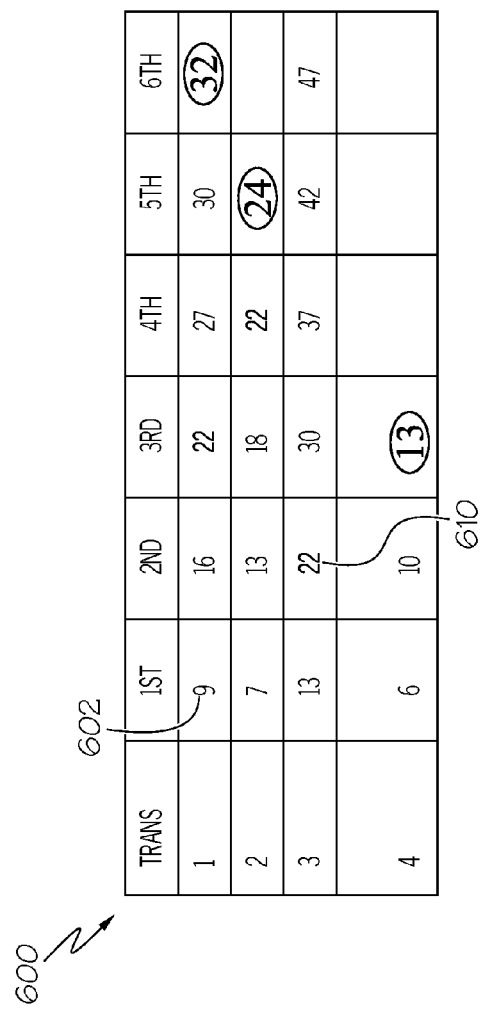
FIG. 11A depicts an example of a first optimized schedule output for assets given the PM intervals calculations and optimal PMs without consideration of labor and budget constraints in one embodiment.

FIG. 11A illustrates an example output 600 after each stage for four transformers. The example output schedule 600 shows the PM action results for the first stage problem where each transformer is optimized independently. Times to carry out a PM activity is reported, e.g., according to a number of month intervals over a planning horizon. In the embodiment shown, only the third transformer (Trans 3) does not need a replacement during the scheduled time horizon. In the example output 600 depicted in FIG. 11A, optimal planned replacements are shown circled.

Figure 11B:
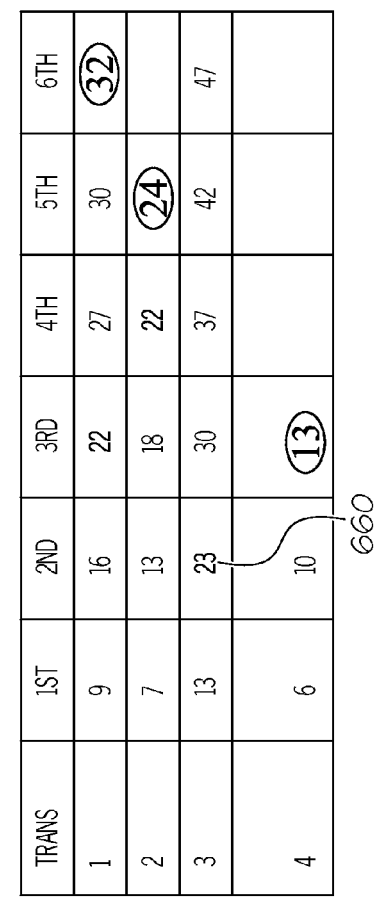
FIG. 11B depicts an example of a second optimized schedule output for assets given the PM intervals calculations of the first optimized schedule output of FIG. 11A, however with consideration of labor and budget constraints in one embodiment.

It is observed that the outputs from the first stage problem violate some global constraints such as the budget availability for the $22^{nd}$ month as indicated at 610 in FIG. 11A. The second stage problem resolves the issue by solving a system-wide problem when selecting a solution as close as possible with the solution from the first stage problem, which is achieved by the scaled objective function (equation 14). FIG. 11B depicts an example of a second optimized schedule 650 output for assets given the PM intervals calculations of the first optimized schedule output 600 of FIG. 11A, however with consideration of labor and budget constraints. The resulting output schedule 650 generated from the second stage problem processing adjusts the second PM of the third transformer for a month later, i.e., at the 23rd month, at 660, to remove the budget constraint for that period.

Figure 12A:
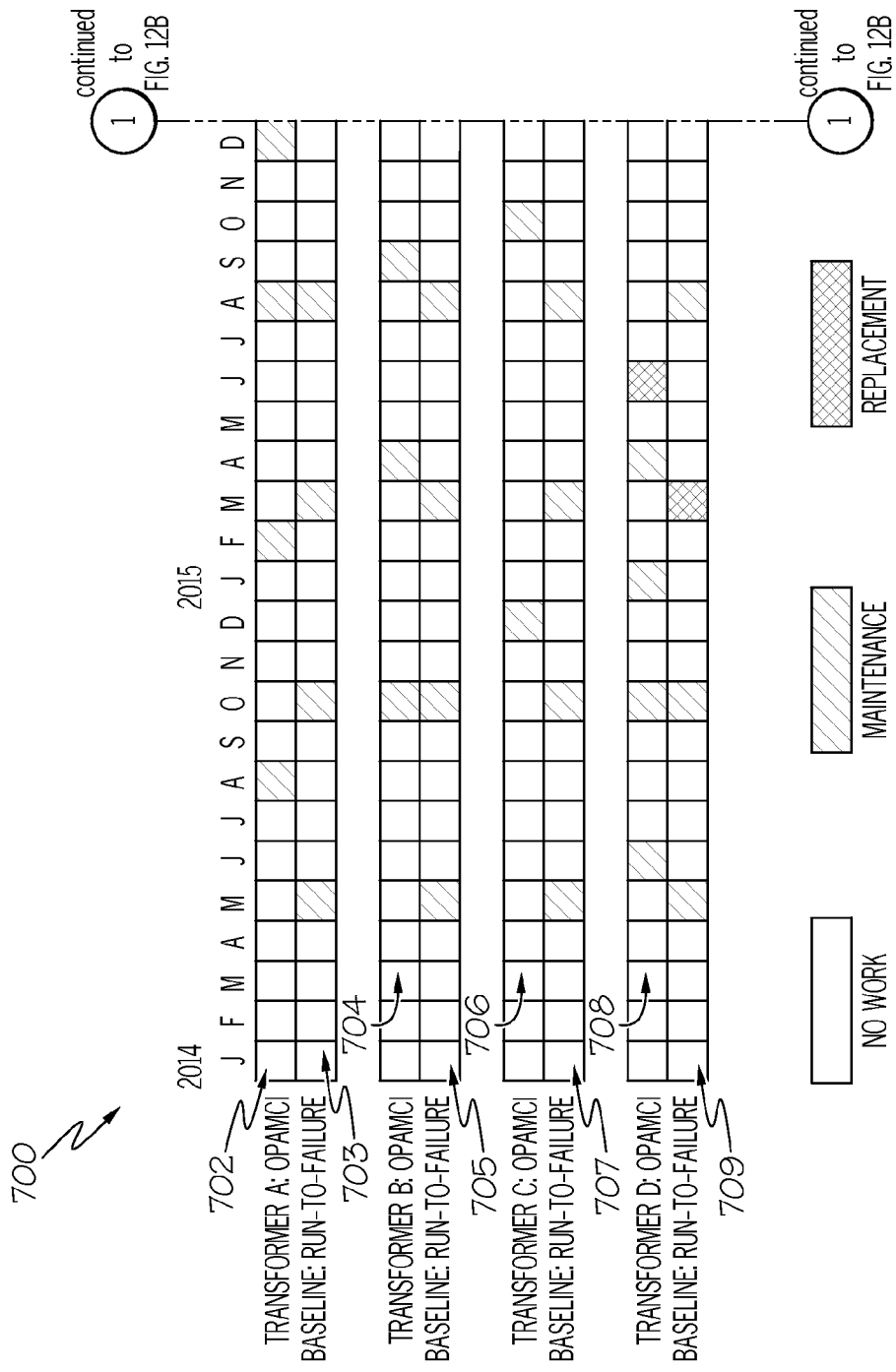
Figure 12B:
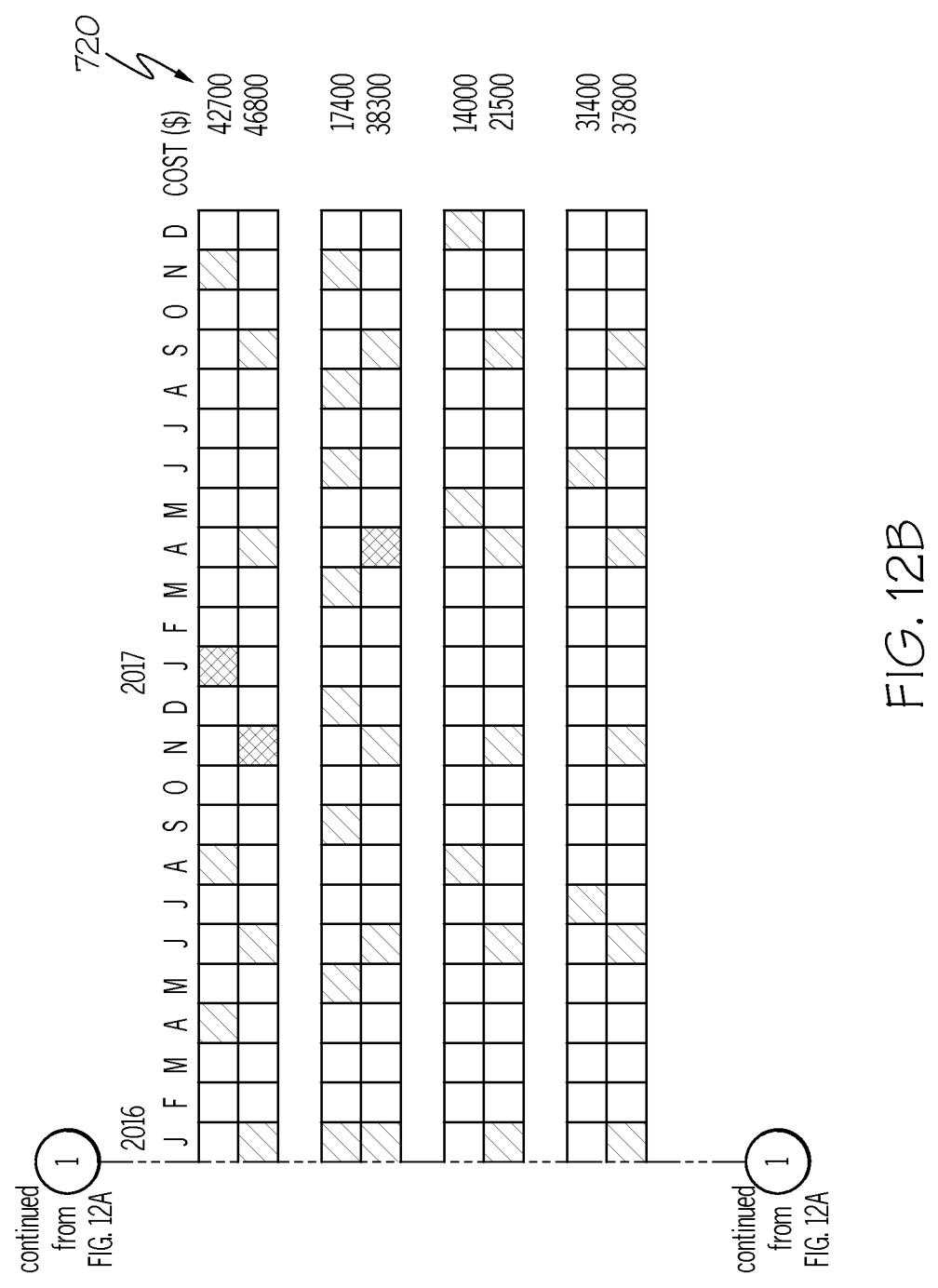

As shown in FIGS. 12A-12B, an example of a total expected cost between the optimized maintenance schedules are compared with a cost resulting from a commonly used baseline scheme, called the "run-to-failure," where a periodic PM is performed. The replacement time for the periodic strategy is determined based on the excess of a threshold for the expected numbers of failures computed from the failure rate function. FIGS. 12A-12B show a final PM result comparison output 700 for a set of transformers. The methods described herein produce a PM schedule of PM intervals for the four assets as shown at 702, 704, 706 and 708. As seen, transformer schedules 702 and 708 include a PM interval for asset replacement. The periodic PM schedules resulting from a baseline approach, as depicted at 703, 705, 707, 709 for each respective transformer, incurs a higher expected cost for all cases as shown in the last column at 720. For the second transformer, there is no need for a replacement during the planned time horizon, while the baseline requires a replacement, which results in a much higher cost. For the case study of 400 transformers within a 4 year plan for $14.5 million of budget, an optimized scheduled spends $13.7 million, while the baseline needs an amount of $17.6 million.

The preventative maintenance scheduling system herein can be used for assets, i.e., equipments in many industries, e.g., for the Energy and Utility, Transportation, Manufacturing, Oil and Gas industries. Implementations of the methods and systems herein provide a maintenance and replacement policy that gives a minimal total cost for the system including the maintenance and replacement costs, interruption cost, and repair cost.

Figure 13:
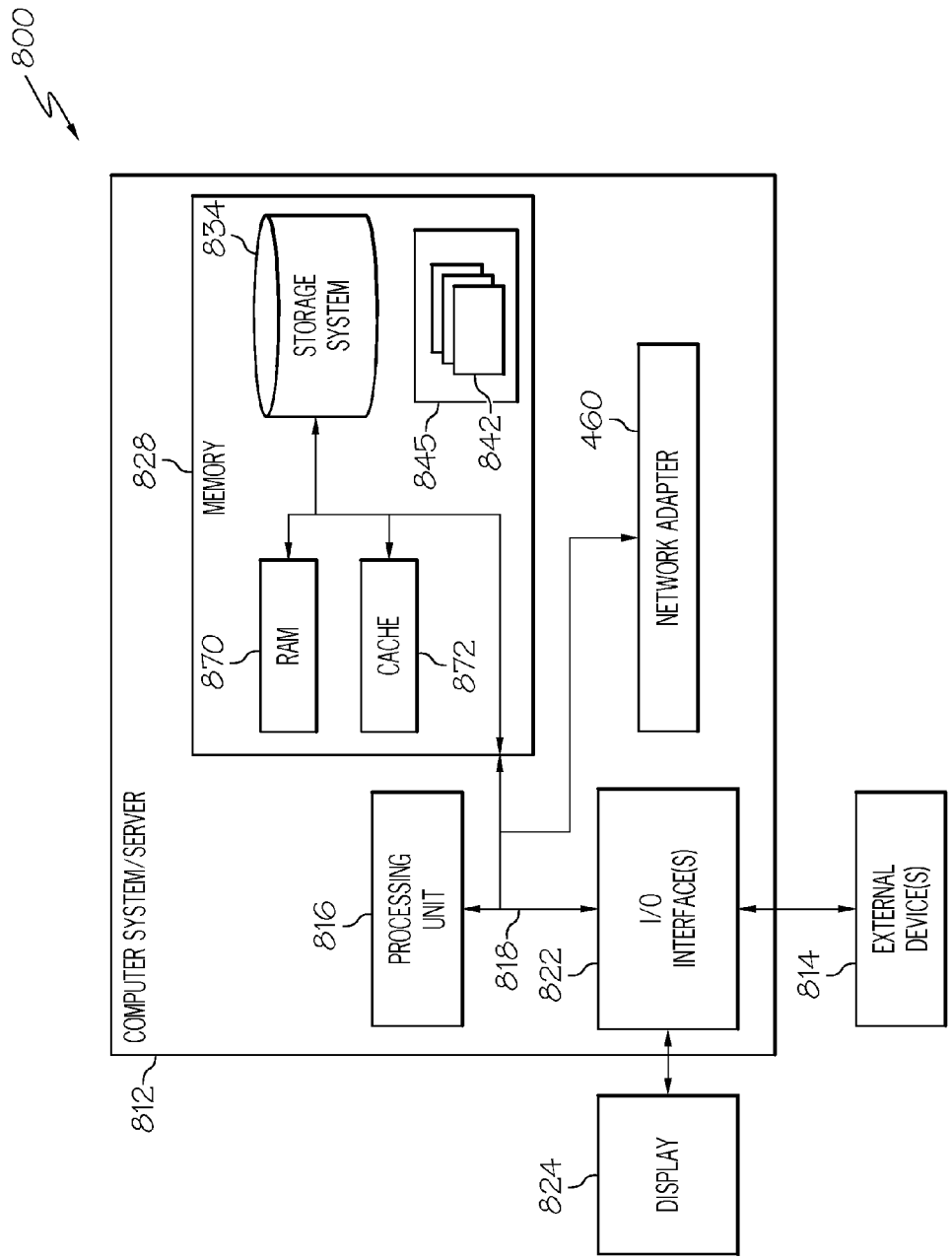
FIG. 13 illustrates one embodiment of an exemplary hardware configuration of a computing system 800 programmed to perform the method steps as described herein with respect to FIGS. 5-10.

FIG. 13 shows a schematic of an example of a computing system 800 capable of being implemented and/or performing any of the functionality set forth hereinabove.

In computing system 800 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 812 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 812 may be practiced in distributed computing environments where tasks are performed by remote processing devices that are linked through a communications network. In a distributed computing environment, program modules may be located in both local and remote computer system storage media including memory storage devices.

As shown in FIG. 13, computer system/server 812 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 870 and/or cache memory 872. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 845, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 860 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for decreasing a failure rate of each asset of a set of assets comprising:

receiving, at a programmed hardware processor, data regarding an asset, said data including a failure rate function capturing a condition of said asset up to a point in time, a cost of preventative maintenance (PM) of said asset, a cost of an asset failure, and a cost of replacing an asset;

receiving, at said programmed hardware processor, a further input specifying a time horizon;

determining, at said programmed hardware processor, whether there is a need to replace said asset, and when a replacement of said asset is needed:

computing, at said programmed hardware processor, a mean cost-rate optimization problem formulated as an objective function of a total cost of the asset over said specified time horizon, said total cost being a function of a cost of preventative maintenance (PM) of said asset for K−1 PMs, and an expected cost of repairs for an asset failure computed as a function of said failure rate function, and the cost of replacing an asset;

computing, using the programmed hardware processor, an optimal number of preventative maintenance actions K and time intervals $t_k$ for each asset independently by minimizing said objective function with respect to an age of the electrical asset $y_k$, where k represents a $k^{th}$ PM, wherein said schedule is formed without considering a labor and budget resource constraint; and the programmed hardware processor device further storing said optimal number of preventative maintenance time intervals for each asset as data in a memory storage device operatively coupled with said processor device; and the programmed hardware processor device generating a final maintenance schedule for the system of assets based on stored said optimal number of preventative maintenance time intervals by minimizing a deviation from the computed optimal PM time intervals subject to the labor and budget resource constraints.

2. The method of claim 1, wherein said optimal number of preventative maintenance time intervals includes: a number K of PM intervals and an indication of a possible replacement; and a time interval $t_k$ for the $k^{th}$ PM.

3. The method of claim 2, further comprising:

receiving, at said programmed hardware processor, an input specifying a time horizon;

determining, at said programmed hardware processor, by said processor device, whether there is a need to replace said asset, and with no replacement needed, determining, at said programmed hardware processor, the optimal scheduled intervals $t_k$ by minimizing a first mean cost-rate optimization problem formulated as a first objective function of a total cost of the asset over said specified time horizon, said total cost being a function of a cost of preventative maintenance (PM) of said asset for K−1 PMs, and an expected cost of repairs for an asset failure computed as a function of a failure rate function.

4. The method of claim 3, wherein the first objective function of a total cost of the asset to be minimized is represented as $f_1(y, K)$ such that:

$$\min_{y,K} f_1(y, K) = c_p(K-1) + c_m \sum_{k=1}^{K} \int_{b_{k-1} y_{k-1}}^{y_k} h_k(t) dt$$

subject to at least one constraint, wherein $c_p$ is a cost of a preventive maintenance (PM) for said asset, K is the number of PMs for said asset, $c_m$ is the cost of an asset failure, $h_k(t)$ is a failure rate function of said asset at the $k^{th}$ PM, $y_k$ is the electrical age of said asset just before the $k^{th}$ PM, and $b_k$ is an adjustment factor in electrical age due to the $k^{th}$ PM.

5. The method of claim 1, wherein the objective function of a total cost of the asset to be minimized is represented as $f_2(y, K)$ such that:

$$\min_{y,K} f_2(y, K) = \frac{c_p(K-1) + c_r + c_m \sum_{k=1}^{K} \int_{b_{k-1}y_{k-1}}^{y_k} h_k(t)dt}{y_K + \sum_{k=1}^{K-1}(1-b_{k-1})y_{k-1}}$$

subject to at least one constraint, wherein $c_p$ is a cost of a preventive maintenance (PM) for said asset, K is the number of PMs and a possible replacement for said asset, $c_r$ is the cost of replacing the asset, $c_m$ is the cost of an asset failure, $h_k(t)$ is a failure rate function of said asset at the $k^{th}$ PM, $y_k$ is the electrical age of said asset just before the $k^{th}$ PM, and $b_k$ is an adjustment factor in electrical age due to the $k^{th}$ PM.

6. The method of claim 1, wherein computing a failure rate function $h_0(t)$ of an asset comprises:
receiving, at said programmed hardware processor, parameter values comprising: Weibull parameter input values $\alpha$, $\beta$, a current age $t_0$ of the asset, a number of simulation intervals N, a time interval $\Delta t$ for simulation, an asset aging factor acc_factor, and a given time t wherein $$N_0 = \left[\frac{t}{\Delta t}\right];$$

and
computing, at said programmed hardware processor:

$$h_{acc}(t) = \beta \left( t_0 + \Delta t \sum_{i=1}^{N_0} \text{"acc\_factor}_i\text{"} + \text{"acc\_factor}_{N_0+1}\text{"}(t - N_0 \Delta t) \right)^{\alpha}$$

wherein said failure rate function $h_0(t)$ is said $h_{acc}(t)$ when t is less than or equal to said specified time horizon.

7. The method of claim 1, wherein said minimizing a deviation from the optimal PM time intervals subject to the labor and budget resource constraints comprises: solving, using parallel integer linear programming at said programmed hardware processor:

$$\min_{x_i^{k,n} \in \{0,1\}} \sum_{i \in I, n \in N, k_n \in K_n} w_n x_i^{k_n, n} |i - t^{k_n, n}|,$$

subject to constraints, wherein
$w_n$ is an impact weight of the n-th asset; $t^{k,n}$ is the optimal PM intervals for the n-th asset; and $x_i^{k,n}$ binary variable indicating whether the k-th PM or a replacement is conducted for the n-th asset during an i-th interval, and said labor and budget resource constraints comprises: a number of PMs for the n-th asset, a $k^{th}$ PM being performed within a lower bound and upper bound deviation of the $k^{th}$ PM of the n-th asset, a total budget constraint, a maximum manpower availability at the i-th interval, and a maximum budget availability at the i-th interval.

8. The method of claim 7 further comprising:
comparing, at said programmed hardware processor, said impact weight $w_n$ against a threshold; and if the impact is bigger than said threshold:
fixing, using said programmed hardware processor, a maintenance schedule computed for the n-the asset; and
selecting, by said programmed hardware processor, values for said lower and upper bounds for PM intervals to reduce a size of integer linear programming problem.

* * * * *